United States Patent [19]
Reinert, Sr.

[11] Patent Number: 5,605,419
[45] Date of Patent: Feb. 25, 1997

[54] UNDERGROUND DUCT BANKS

[76] Inventor: Gary L. Reinert, Sr., 4319 Middle Rd., Allison Park, Pa. 15101

[21] Appl. No.: 259,393

[22] Filed: Jun. 14, 1994

[51] Int. Cl.$^6$ ........................................ F16L 1/00
[52] U.S. Cl. ...................... 405/154; 138/113; 405/157
[58] Field of Search .................... 405/157, 156, 405/155, 154; 285/201, 202; 138/111, 113; 52/20

[56] References Cited

U.S. PATENT DOCUMENTS

| | | | |
|---|---|---|---|
| 245,285 | 8/1881 | Detrick | 138/105 |
| 374,458 | 12/1887 | Davis | 52/20 X |
| 1,329,040 | 1/1920 | Davis | 285/201 |
| 1,525,087 | 2/1925 | Murray | 138/111 X |
| 1,792,855 | 2/1931 | McRae | 405/157 X |
| 1,805,990 | 5/1931 | Makowski | 138/106 |
| 3,543,457 | 12/1970 | Budlong | 52/20 X |
| 3,643,005 | 2/1972 | Mathews | 138/104 |
| 3,731,448 | 5/1973 | Leo | 52/20 X |
| 3,977,703 | 8/1976 | Curtis | 405/178 X |
| 4,009,545 | 3/1977 | Rossborough | 52/20 X |
| 4,149,567 | 4/1979 | Weirich | 138/111 |
| 4,162,865 | 7/1979 | Aubet | 405/154 |
| 4,183,484 | 1/1980 | Mathews | 405/154 X |
| 4,718,459 | 1/1988 | Adorjan | 138/105 |
| 5,141,260 | 8/1992 | Burwell | 405/52 |
| 5,192,165 | 3/1993 | Torielli | 405/156 |

OTHER PUBLICATIONS

OSHA Regulation Subpart P —Excavations, 29 CFR 1926.650 et seq.

Primary Examiner—Dennis L. Taylor
Attorney, Agent, or Firm—Douglas G. Glantz

[57] ABSTRACT

Flexible, elongated, tubular ducts or conduits are assembled above ground on transverse supports into a duct bank of an array of layers held by a plastic grid of transverse spacers. An underground trench can be excavated having substantially straight sidewalls, while excavated soil from the trench is placed on the side away from the assembled duct bank. Two or more pieces of equipment, spaced apart, sequentially lift and laterally move the assembled duct bank to the trench. Transverse support members spanning the trench are removed, and the assembled duct bank is lifted and lowered sequentially into the trench using a small angle of displacement from the horizontal while lowering the assembled duct bank onto transverse support members positioned in the bottom of the trench, to provide an underground duct bank. Round, freely rotatable, plastic spacers in groups of four facilitate lowering the assembled duct bank into the trench. In one aspect, the ducts or conduits are connected to a concrete manhole at a sidewall through a bell-end, adjustable in length, having threads in the outer surface of the bell-end for receiving an adapter threaded on one end and adapted to receive the duct or conduit into the adapter's other end.

9 Claims, 12 Drawing Sheets

UNDERGROUND DUCT BANKS

BACKGROUND OF THE INVENTION

1. Technical Field

This invention relates to method and apparatus for installing underground duct banks. In one aspect, the invention relates to method and apparatus for installing duct banks utilized for carrying and protecting underground electrical wiring and cabling systems in construction projects.

2. Background

The transmission of electrical power, electrical control signals, and telephone communications is carried out through wires and cables installed inside conduits called ducts from one point of a construction project to another, including to and through buildings under construction. These ducts are assembled in banks called conduit banks or duct banks. The distances involved can be from a few hundred feet to a few miles, and the conventional duct bank is assembled inside an underground trench.

For long distances, precast concrete manholes are installed at intervals of about 500 feet or more, thereby to facilitate pulling the cables through the inside of the ducts (conduits). The precast concrete manholes generally are installed prior to excavating the trench. The precast concrete manholes are used to pull the cables through the ducts (conduits) and for connecting the pulled cables to the next lengths of cables pulled through the next length of duct bank. Cable pulling through the ducts (conduits) is always done after the duct bank installation is complete. These ducts (conduits) typically are made of plastic material which give them some flexibility.

Conventional duct banks are assembled inside trenches excavated below ground. The manholes are installed before the trench is excavated. Then the duct banks are assembled in situ in the trench, and the entire length of the assembled duct bank generally is encased totally in a concrete envelope before backfilling the trench with excavated soil, in order to restore the site to the original grade. Occasionally after the duct banks are assembled, the trench is backfilled with the excavated soil, instead of encasing the duct bank in concrete.

Workers must assemble the duct banks working inside the trench, which could be as deep as 13 to 16 feet below grade and deeper. Therefore, production and workman's safety are at risk, which means the construction costs are very high. OSHA regulations (29 CFR 1926.650, Appendix B to Subpart P, "Sloping and Benching") mandate the trench to be excavated with safety slopes of 1 to 1, varying to 2 to 1 and flatter, depending on the total depth of the trench and the soil characteristics, thereby to prevent the trench walls from collapsing on top of the workers.

In digging the trench with safety slopes, the digging operator has very little choice but to set the excavated soils on both sides of the trench.

Since the duct bank is assembled inside the trench, the workers assembling the duct bank inside the trench very often must stand and walk on the duct bank itself as it is being assembled. The workers in the trench also require the assistance of workers above the ground. The above-ground workers must carry 10 to 20 feet long pieces of conduit (duct) and other components required for the assembling of the duct bank while walking over the piles of excavated soil created when the safety slopes were excavated. This makes for low productivity and the requirement always to monitor safety conditions for the workers above ground.

Conduits typically are assembled in layers by using plastic spacers. Each plastic spacer rests on two bricks on the bottom of the trench.

If it rains, the excavated soil at the top of the trench runs back down into the trench as mud, thereby partially covering the partially assembled work inside the underground trench. In such a case, contractual terms and conditions obligate the contractor to disassemble the partially completed work, clean the trench, and start over again.

Installations of duct banks by conventional methods take several days for the completion of a distance of 500 feet, e.g., the distance typically between two precast concrete manholes. The trench must be excavated first. Next, the safety slopes are excavated on each side of the trench. Then, trench shoring or trench boxing is installed. The duct bank then is built in situ inside the trench. Depending on the soil characteristics and the depth of the trench, the trench in the traditional method is required to have trench shoring made of overlapping layers of sheets of plywood, with bracing across the trench and against 12 inches wide planks which in turn are set against the plywood sheets. Additional bracing also is required to be set against the sloping walls. Occasionally, when the trench is dug with straight walls, instead of trench shoring, trench boxing is utilized, which is made of steel plates kept apart by hydraulically or manually expanded bracing structures positioned across the trench and against the steel plates. The bracing structures are built in 20-feet long steel sections which must be moved by crane, along the trench, as the duct bank assembly progresses.

The trench shoring must be removed prior to pouring the concrete. Then forms must be built for pouring the concrete. The concrete is poured in such a manner as to encase the duct bank, by pouring the concrete in between the individual ducts as well as 3 inches all around the conduit's bottom, sides, and top, thereby encasing the entire duct bank in a concrete block. The forms must be removed prior to backfilling the trench.

Before pouring the concrete, conduits from each duct bank length built inside the trench must be tied into the manhole at each end of each length of duct bank in the trench. Manholes are made of precast concrete. The manhole wall thickness, at the tie-in points, varies depending on the manhole location and the potential axial loading, i.e., the weight which the manhole structure is designed to support. By the conventional method, the manhole walls are broken by sledge-hammering, which produces a large, very irregular opening on the manhole wall. A piece of plywood board is fixed temporarily against the inside of the precast manhole wall to cover the opening created by sledge-hammering. This plywood board is attached temporarily to the manhole inside wall by utilizing lead anchors on two-feet centers. Plywood board is removed after pouring the concrete. Next, one standard bell-end for each conduit on the duct bank is attached to the plywood board to coincide with the elevation and lateral position of the conduit to be tied into each standard bell-end. Each bell-end is tied-down against the board by means of tie-wires through holes drilled through the plywood board, thereby to prevent the bell-ends from moving too much when concrete is poured to encase the entire duct bank.

Straight conduit couplings, without a dividing rib on the inside, are inserted over the ends of each conduit from the duct bank. Couplings are inserted over the ends leaving a few inches exposed to apply an special adhesive later.

One end of an additional standard length of conduit is coated with a special adhesive and inserted into the bell-ends starting from the bottom layer of bell-ends. This insertion operation is performed from inside of the trench. The special adhesive sets in a matter of seconds. After each individual standard length of conduit is firmly glued to its respective bell-end, the conduit is saw-cut so as to have its other end approximately abutting to the end from the corresponding conduit from the duct bank.

Now the end from the corresponding conduit from the duct bank and the end from the conduit are coated with the special adhesive, and the coupling is tapped on one end, thereby to slide the coupling easily and quickly over both ends. This coupling completes the tie-in to the manhole for that one conduit from the duct bank. The overall operation is repeated for each conduit from the duct bank until all conduits are tied into the manhole.

After the above-described tie-ins are made, concrete is poured to encase the duct bank and to fill openings created by jackhammering on the manhole walls. Pouring starts from the center of the duct bank length, and pouring continues toward each manhole. After the concrete sets, the plywood boards are removed. Many irregularities remain on the surface of the inside wall of the manholes, and these irregularities must be patched.

Because the whole process typically takes several days for the completion of the installation by the conventional method, the trench must be barricaded and fully illuminated at night to prevent people from falling into it, until the installation is complete, i.e., until the duct bank has been fully assembled, the concrete has been poured to encase it, and the trench has been backfilled to the original grade.

In this manner, the conventional art method involves installing the duct banks inside trenches with safety slopes with or without trench shoring. Depending on the depth of the trench and the type of soils, the conventional methods also involve installing the duct banks inside trenches with straight walls by using steel trench boxing with hydraulically or manually expandable bracing across the trench. Whether the installation by conventional methods takes place inside trenches with sloped walls or inside trenches with straight walls with steel trench boxing, it is always done with a combination of workers performing the actual assemblage of the duct bank inside the trench, while other workers, stationed above ground, assist by handing down the component parts for the assembly of the duct bank to the workers inside the trench, stationed below ground, and while the above-ground workers walking over piles of excavated soils carry the components and further including performing sledge-hammering the walls of the manholes to complete the tie-ins, as described above.

There are many costly problems and drawbacks associated with the utilization of the conventional method. One problem is that the workers must assemble the duct bank while working inside a trench. The workers very often must stand and walk on the duct bank itself as it is assembled. Above-ground workers are needed to assist the workers inside the trench.

Another drawback is apparent in the requirement that any trench deeper than 4 feet, as mandated by OSHA regulations, must be excavated with safety slopes or otherwise be protected by installing an expensive steel trench boxing system.

A further drawback is the requirement to shore up the trench walls and to install forms for pouring the encasing concrete envelope and to remove both the shoring and the forms.

Conventional methods further require breaking the walls on each manhole by sledge-hammering or by other methods in order to create an opening for making the tie-ins at each end of the duct bank.

Conventional methods require many days to complete an installation. Another drawback with the lengthy time required in the conventional methods is weather dependency, especially in respect to rain conditions.

A further drawback is the requirement to barricade the trench and to illuminate it fully at night because it takes several days to assemble a standard five hundred (500) feet length of duct bank inside the trench.

Therefore, novel apparatus and method are needed to provide for the installation of underground duct banks for electrical cables or fiber optics cables or the like and to eliminate the problems and drawbacks of the conventional methods.

It is an object of the present invention to provide for the installation of underground duct banks by means and method which substantially reduce the assemblage of the duct bank inside the trench and which substantially reduce the amount of time needed for workers stationed inside the trench. A further object of the present invention is to eliminate the need for workers to walk on the underground duct bank as it is being assembled.

A further object of the present invention is to improve worker safety in the installation of underground duct banks.

A further object of the present invention is to provide for the installation of underground duct banks by means and method which eliminate the need to excavate the trench with slopes.

Another object of the present invention is to provide for the installation of underground duct banks by means and method which eliminate the need for trench shoring and trench boxing and which also eliminate the need for construction forms.

Another object of the present invention is to provide for the installation of underground duct banks by means and method which eliminate the need for above-ground workers to carry duct bank component parts over piles of excavated soil.

A further object of the present invention is to provide means and method for the installation of underground duct banks and eliminate the requirement to break manhole walls for making tie-ins at each end of the duct bank.

It is a still further object of the present invention to provide for the installation of underground duct banks and substantially reduce the number of days required to complete the installation process.

Yet another object of the present invention is to provide for the installation of underground duct banks and substantially reduce weather dependency.

Also an object of the present invention is to provide means and method for the installation of underground duct banks which eliminate the need to barricade the trench and also which eliminate the need to illuminate the trench at night.

These and other objects of the present invention will become apparent to those skilled in the art from a careful review of the detailed description which follows.

BRIEF DESCRIPTION OF DRAWINGS

FIG. 6 generally represents the conventional method.

SUMMARY OF THE INVENTION

Figure 1:
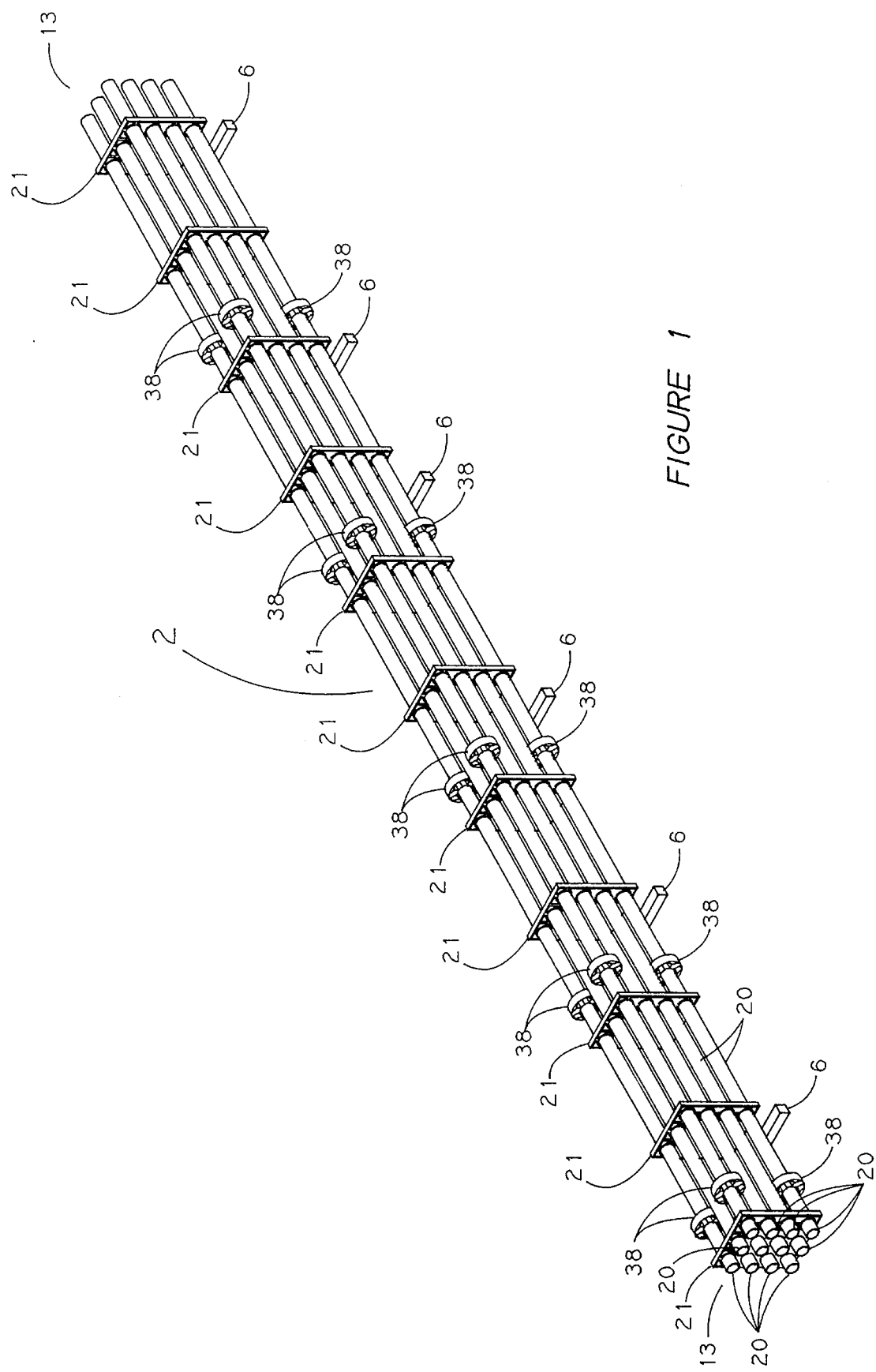
FIG. 1 provides a perspective view of the duct bank preassembled on supports above ground in accordance with the present invention, prior to digging the trench.

The present invention provides method and apparatus for installing an underground duct bank, including a plurality of flexible, substantially hollow, elongated tubular ducts or conduits assembled in an array of layers held by a plastic grid of transverse spacers and supported above ground on transverse support members. An underground trench is excavated having substantially straight sidewalls, while placing excavated soil from the trench on the above-ground side of the trench away from the assembled duct bank. The assembled duct bank is placed into the underground trench by sequentially lifting the assembled duct bank, removing transverse support members spanning the trench, and sequentially lowering the assembled duct bank into the trench using two or more pieces of lifting and lowering equipment to provide for a small angle of displacement from the horizontal for the assembled duct bank, while lowering the assembled duct bank into the bottom of the trench, and onto transverse support members positioned in the bottom of the trench, to provide an underground duct bank. Plastic spacers in groups of four are positioned to facilitate lowering the assembled duct bank into the trench. In one aspect, placing the assembled duct bank into the underground trench includes laterally moving the assembled duct bank to a position over the trench supported by transverse support members spanning the trench to position the assembled duct bank above ground directly over the trench. In one aspect, the ducts or conduits are connected to a concrete manhole at a sidewall through a bell-end, adjustable in length, having threads in the outer surface of the bell-end for receiving an adapter threaded on one end and adapted to receive the duct or conduit into the adapter's other end.

DETAILED DESCRIPTION OF THE PREFERRED EMBODIMENT

The method and apparatus for installation of underground duct banks of the present invention generally provide for assembling a certain length of duct bank above the ground, prior to excavating a trench where the duct bank finally will be set. Prior to excavating the trench, precast concrete manholes are installed in the ground. After the duct bank assemblage is completed above ground, the trench is excavated, and the duct bank is placed inside the trench. When the entire duct bank length is resting on supports placed on the bottom of the trench and when tie-ins to the precast concrete manholes on each end are completed, concrete is poured to encase the duct bank completely in a concrete block called a concrete envelope. Finally, the trench is backfilled with soils from the prior excavation of the trench. Then cables such as electrical cables can be pulled, from the manholes, through the inside of each conduit on the duct bank.

By the method and means of the present invention, the excavating of the trench, the setting of the duct bank inside, the tieing-in of the duct bank to the manholes, the pouring of concrete, and the backfilling of the trench can be done all in the same day. This time-saving feature substantially reduces weather dependency because the assemblage of the duct bank and the performance of the remainder of the operations to complete the installation can be done independently. Therefore, the excavation of the trench and the completion of the installation can be done when the weather is favorable. The backfilling of the trench on the same day is possible by using "High Early Concrete" instead of regular concrete. When regular concrete is used, the backfilling is done the next day, and in such a case, rain has no negative effect because the concrete has already been poured.

Figure 14:
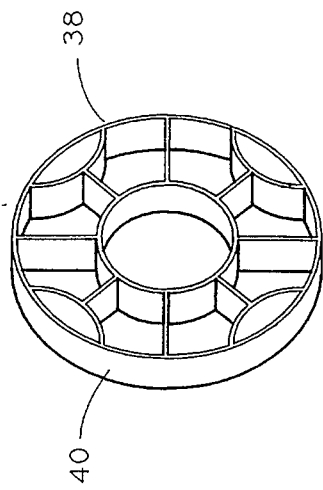
FIG. 14 provides a perspective detail view of the round supports on the corner conduits as shown in FIG. 13.

Referring now to FIG. 1, duct bank 2 generally consists of one or more layers of plastic ducts 20, also called conduits, kept in place by means of plastic grid 21 of transverse spacers at intervals of about four feet or more. Plastic gives conduits 20 some flexibility, which becomes more apparent when assembled in length. These ducts (conduits) 20 are installed in lengths, by way of example, of either ten or twenty feet and then are glued together with a special adhesive to achieve the required length of each conduit 20 in each layer. In accordance with the present invention, round plastic spacers 38 (shown in detail later in FIG. 14), preferably which are free to rotate, are installed, e.g., in groups of four, one on the conduit on each corner of the cross section of duct bank 2. These groups of four round plastic spacers 38 are installed at intervals, by way of example at approximately twenty feet intervals, on the duct bank 2 length.

By the method and means of the present invention, supports 6 are required for carrying the load (weight) of duct bank 2 and to allow for the necessary space between the bottom of the conduits and the ground, upon which supports rest, for lifting purposes. Supports 6 are spaced, by way of example, 8 to 10 feet apart, or as required, depending on the size of duct bank 2. These supports 6 can be made of standard lumber cuts of the proper dimensions or other types of materials such as steel pipes and others.

Figure 2:
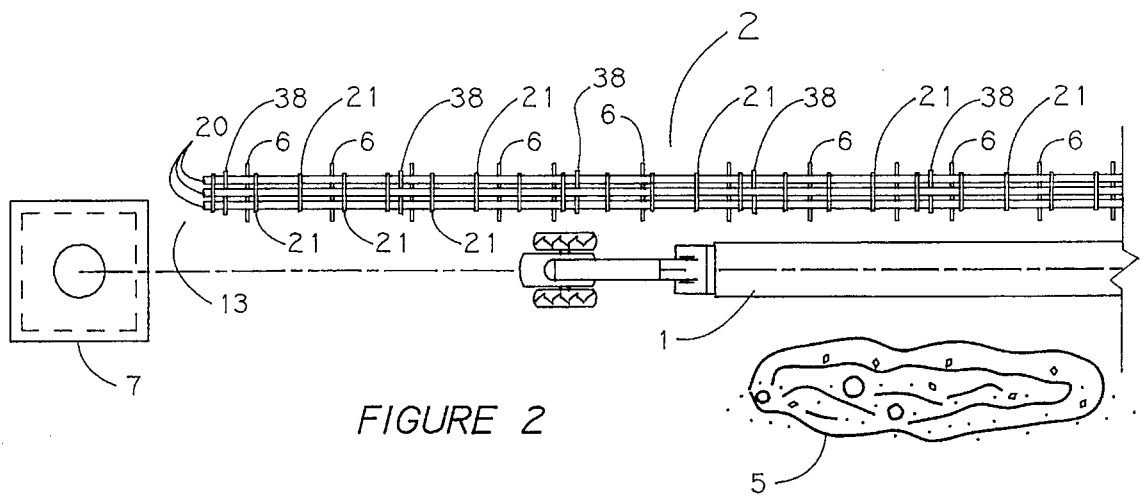
FIG. 2 shows a plan view of the duct bank preassembled on supports above ground in accordance with the present invention and includes a view of a trench-digging machine in the process of digging the trench.

Referring now to FIG. 2, the present invention provides that duct bank 2 is completely assembled above ground. Trench 1 is excavated, and excavated soils 5 are deposited above ground, on the side of trench 1 opposite the side where duct bank 2 was assembled.

Duct bank 2 is generally installed in lengths, e.g., of approximately five hundred feet, connecting at each end to a manhole 7. In accordance with the present invention, a final tie-in connection to the manholes is done by workers inside an enlarged trench. The distance from the assembled end 13 of duct bank 2 to manholes 7, by way of example, is approximately 10 to 20 feet.

Final tie-ins also are made to or through a building wall (not shown) on at least one end of a completed duct bank.

Precast concrete manholes 7 are utilized to pull power, control, communications, fiber optic, and other cables through the inside of plastic conduits 20 and for making splacings (connections) to the cables that are pulled through the next length of conduit to be connected on the other side of manhole 7.

By the method and means of the present invention, duct bank 2 is assembled on supports 6 above ground, from end 13 to other end 13 (not shown). A small length of ten to twenty feet from end 13 to manhole 7 or to a building wall (not shown) is assembled by workers inside an enlarged trench 1. In accordance with the present invention, the final connection to the manhole 7 or to the building wall, also called a tie-in, is performed from the inside of the trench 1.

Figure 3:
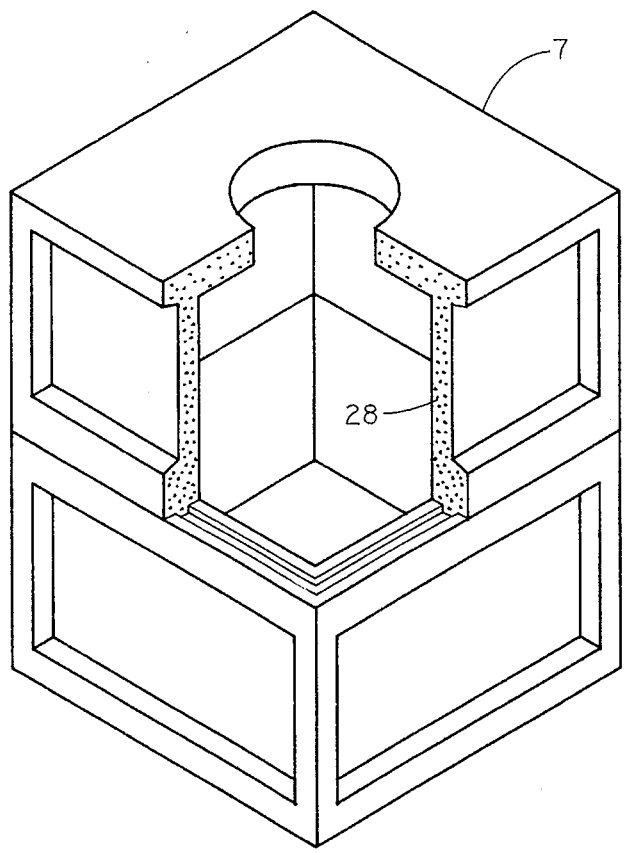
FIG. 3 provides a perspective view of a manhole and a corner cutaway showing its wall thickness.

FIG. 3 shows an orthogonal perspective view of manhole 7, partially in section, to show sidewalls 28. Manholes 7 are made of precast concrete. The manhole wall 28 thickness, at the tie-in points, varies depending on the manhole location and the potential axial loading, i.e., the weight it could be subjected to.

Figure 4:
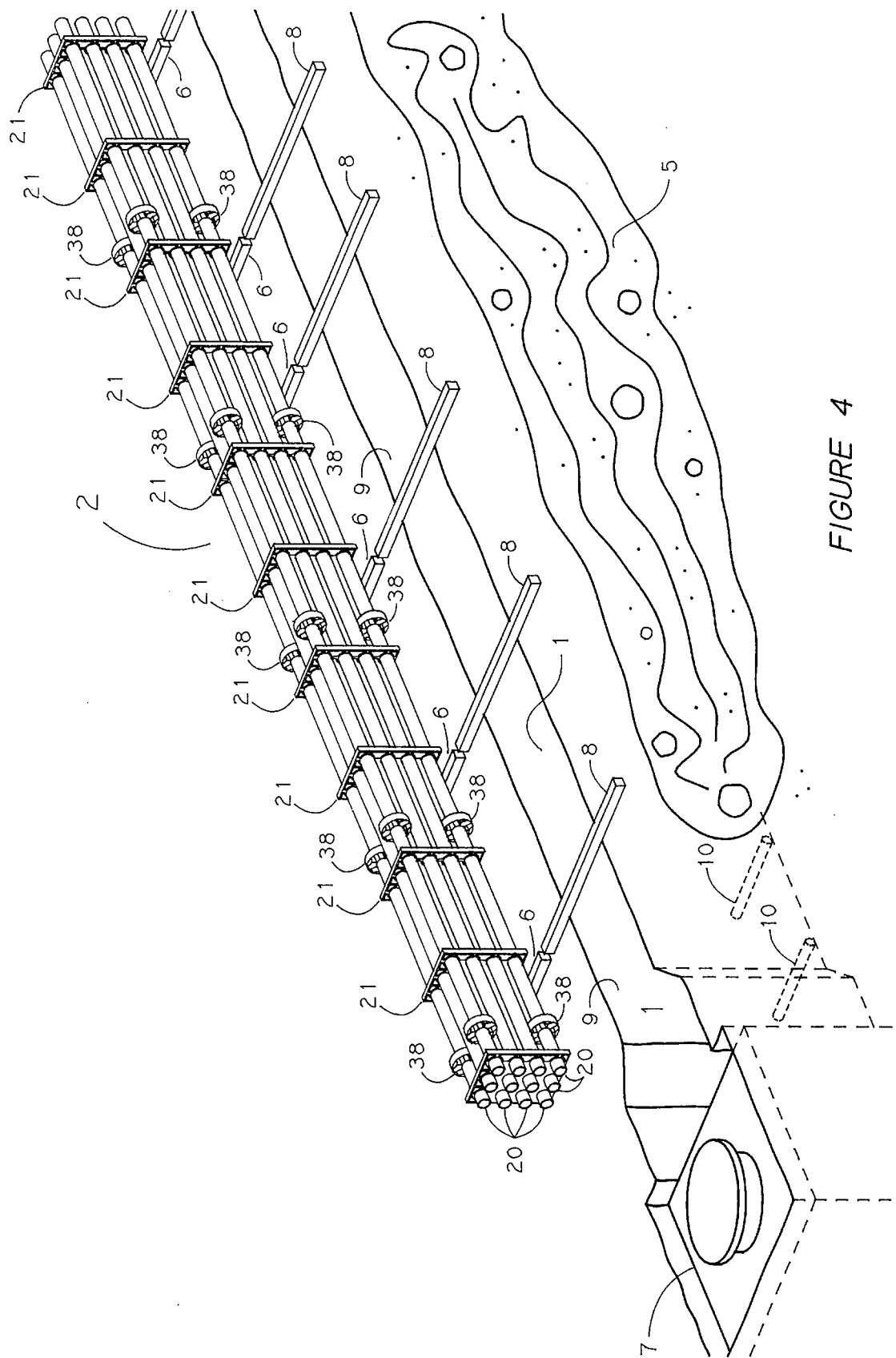
FIG. 4 provides a perspective view of the duct bank preassembled on supports above ground, a straight-walled trench dug after the assemblage of the duct bank with supports across the top of the trench and on its bottom, and a partial view of a manhole.
Figure 5:
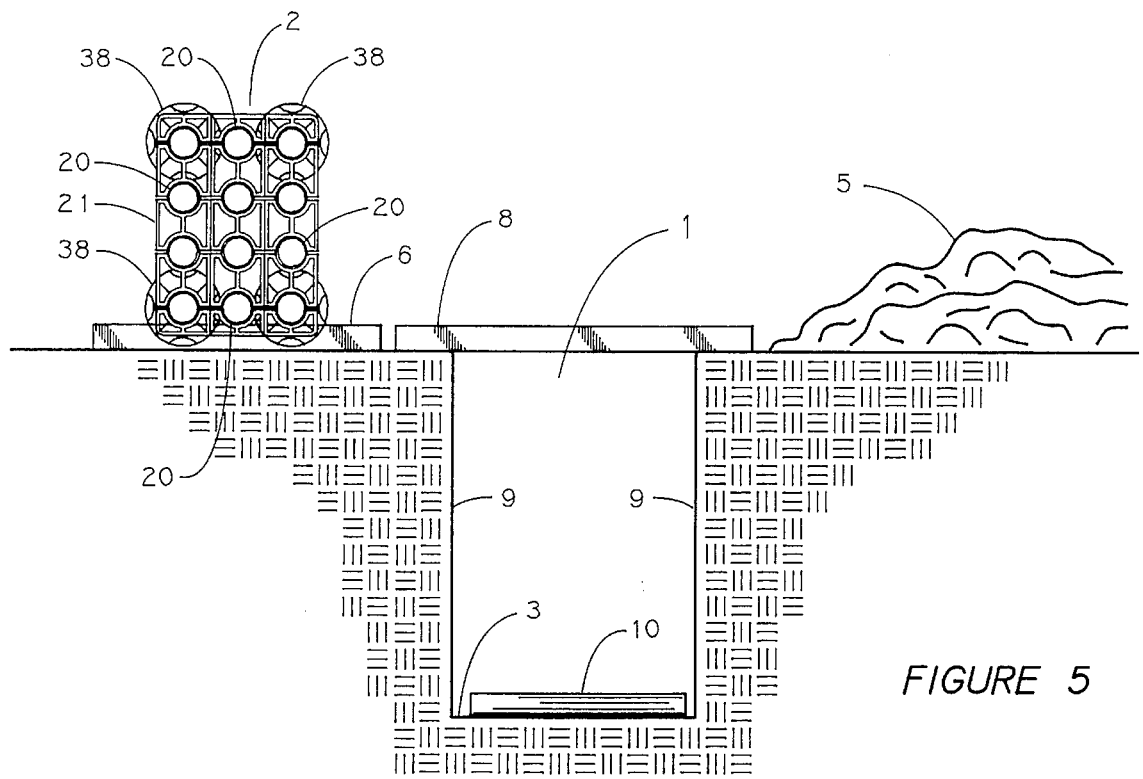
FIG. 5 provides a sectional view of the trench with straight walls, the duct bank preassembled on supports above ground, and a view of supports over the top of the trench and on its bottom.

Referring to FIGS. 4 and 5, by the method and means of the present invention, supports 8 made of lumber or other stronger materials (depending on the weight of the duct bank) are set across the top of the trench at intervals which coincide with supports 6 upon which duct bank 2 was assembled.

Trench 1 is excavated with straight walls 9. Safety slopes 91, as depicted in FIG. 6, are not required because duct bank 2 is not assembled inside the trench, as was required by the traditional method of installation.

At this point, pieces of 2½ inch (nominal size) conduit 10 which are 3 inches outside diameter are positioned transversely to the trench 1 direction and placed onto the bottom 3 of trench 1 over the entire length of trench 1 at intervals, by way of example, of 6 to 7 feet. These pieces of conduit 10 are of a length, e.g., approximately equal to the width of duct bank 2 and are used as concrete spacers, e.g., to provide a 3 inch space between the bottom of conduits 20 and bottom 3 of the trench 1. Supports 10 provide a larger area for distributing the weight of duct bank 2 and prevent portions of duct bank 2 from sinking into the soil at the bottom of the trench.

Figure 6:
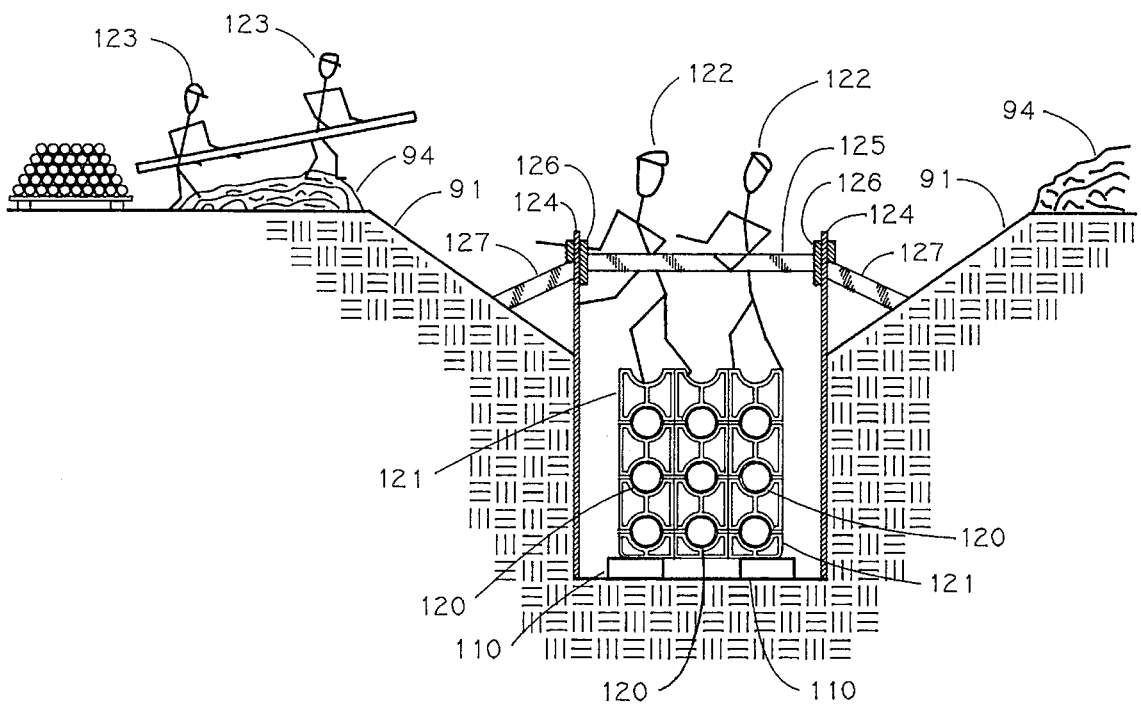
FIG. 6 shows a sectional view of the conventional method slopped-wall trench and workers assembling the duct bank inside the trench and above-ground workers carrying component parts over to the trench while walking over piles of excavated soil. Trench shoring also is shown.

Referring to FIG. 6, which represents the prior art, conventional duct banks are assembled inside trenches excavated in the ground. Then generally, the entire length of the duct bank is encased totally in a concrete envelope before backfilling the trench with excavated soil 94, in order to restore the site to original grade. Occasionally after the duct banks are assembled, the trench is backfilled with the excavated soil, instead of encasing the duct bank in concrete. The manholes are installed before the trench is excavated.

Workers 122 must assemble the duct banks working inside the trench, which could be as deep as 13 to 16 feet below grade and deeper; therefore production and workman's safety are at risk of being reduced, which means the costs of construction are very high. OSHA regulations (29 CFR 1926.650, Appendix B to Subpart P, "Sloping and Benching") mandate the trench to be excavated with safety slopes 91 of 1 to 1, 2 to 1, and flatter, depending on the total depth of the trench and the soil characteristics, in order to prevent the trench walls from collapsing on top of the workers. Alternatively, in the case of a straight walled trench in which workers are to be stationed, the sides of the trench must be protected by installations of trench boxing.

The digging of the trench with safety slopes 91 leaves very little choice to the digging operator but to set the excavated soils 94 on both sides of the trench.

Since the duct bank is assembled inside the trench in the conventional method, whether with sloped walls or with straight walls with trench boxing, the workers 122 assembling the duct bank very often must stand and walk on the duct bank itself as it is assembled. They also require the assistance of workers 123 above the ground. The above-ground workers must carry 10 to 20 feet long pieces of conduit (duct) and other components required for the assembling of the duct bank while walking over the piles of excavated soil 94 created when the safety slopes were excavated. This means low productivity and constant monitoring of safety conditions by the workers stationed above-ground.

Conduits 120 are assembled in layers, by using plastic spacers 121. Each plastic spacer 121 rests on two bricks 110 on the bottom of the trench.

If it rains, the excavated soil at the top of the trench runs back down slope 91 into the trench as mud, partially covering the partially assembled work. In such an event, contractual terms and conditions obligate the contractor to disassemble the work, clean the trench, and start over again.

The installation by the conventional method as shown in FIG. 6 takes several days for the completion of a distance of 500 feet between two precast concrete manholes, which is more or less the standard distance between manholes for duct banks 500 feet or longer. The trench must be excavated first, next the safety slopes 91 are excavated on each side of the trench, and then trench shoring 124 or trench boxing is installed. Next the duct bank is built inside the trench. Depending on the soil characteristics, the trench in the conventional method is required to have trench shoring 124, made of overlapping layers of sheets of plywood, with bracing 125 across the trench and against 12 inch planks 126 which in turn are set against the plywood sheets. Additional bracing 127 is also required to be set against the sloping walls 91. Occasionally, the trench is dug with straight walls, and in lieu of trench shoring, trench boxing is utilized. The trench boxing is made of steel plates kept apart by hydraulically expanded bracing across the trench and against the steel plates. They are built in 20-feet long sections which are moved by crane, along the trench, as the duct bank assembly progresses, thereby making such installations even more expensive.

The trench shoring or the trench boxing must be removed prior to pouring the concrete. Then forms must be built, from the beginning of the slope and above the duct bank height, for pouring the concrete. The concrete is poured in such a manner as to encase the duct bank, by pouring it in between the individual ducts as well as 3 inches all around its bottom, its sides, and its top, encasing the entire duct bank in a concrete block. The forms must be removed prior to backfilling the trench.

Before pouring the concrete, conduits from each duct bank length built inside the trench must be tied into the manhole at each end of each length of duct bank in the trench.

Because the whole process takes several days for the completion of the installation by the conventional method, the trench must be barricaded and fully illuminated at night to prevent people from falling into it, until the installation is complete, i.e., after the duct bank is assembled, after concrete has been poured to encase it, and after the trench is backfilled to the original grade.

The process steps of installing the duct banks inside trenches with safety slopes 91 (FIG. 6) with trench shoring 124, by a combination of workers 122 performing the actual assemblage of the duct bank inside the trench, while other workers 123, stationed above ground, assist by handing down the component parts 124 for the assembly of the duct bank, to the workers 122 inside the trench, below ground, and while the above-ground workers carry the components walking over piles of excavated soils 94, and sledge-hammering the walls of the manholes to complete the tie-ins, as described above, constitute the conventional method.

In accordance with the method and apparatus of the present invention, the setting of duct bank 2 into trench 1 is accomplished in two steps. The first step (FIGS. 7 and 8) is to move the duct bank from the top of supports 6, upon which it was assembled above ground, over to supports 8 which are set across the top of trench 1.

Figure 7:
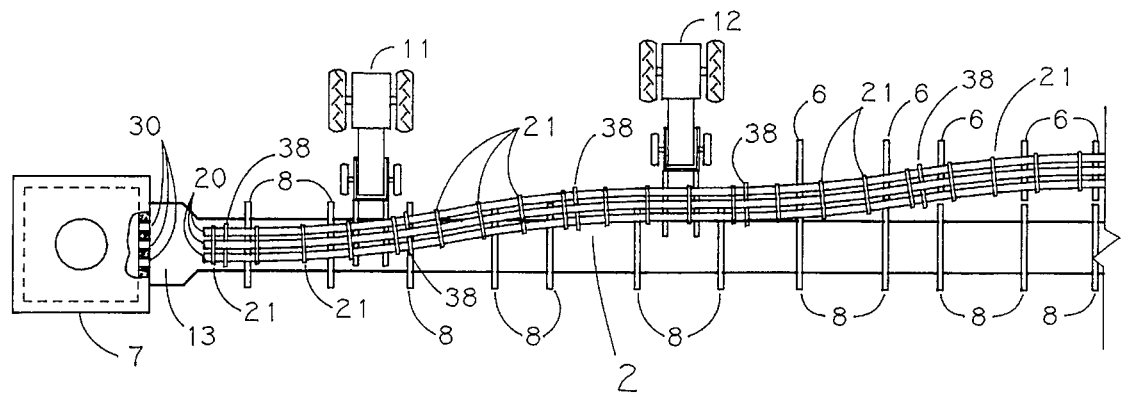
FIG. 7 shows a plan view of the duct bank being moved over to the top of the trench by two pieces of equipment in accordance with the present invention.
Figure 8:
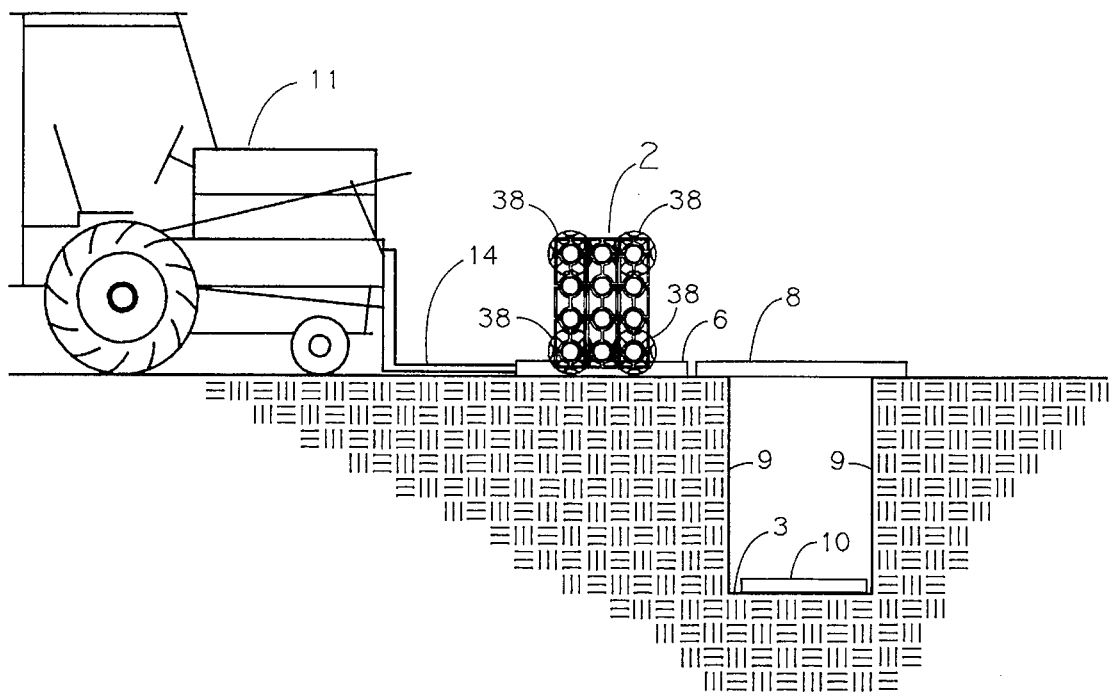
FIG. 8 provides a sectional view of a piece of equipment lifting one end of the duct bank in preparation to move it over to the top of the trench in accordance with the present invention.

FIGS. 7 and 8 demonstrate the first step. Two fork lifts 11, 12, hereby called Equipment "A" 11 and Equipment "B" 12 (or any other two pieces of equipment with forks 14, or any crane type lifting equipment) are set apart, by way of example, approximately 30 feet from each other. Equipment "A" 11 and Equipment "B" 12 are set apart a distance which depends on the size and weight of the duct bank. Duct banks with conduit 20 larger in diameter or with a greater number of conduits in its cross section could require a different distance between Equipment "A" 11 and Equipment "B" 12. Equipment "A" 11 is set initially, e.g., at approximately 10 feet from one of the two ends 13 from where the operation begins.

Equipment "A" 11 and "B" 12 lift a portion of duct bank 2 with their forks 14 to a position just above supports 6. Then supports 6 are removed from under the portion of lifted duct bank 2. Then Equipment "A" 11 proceeds to carry its end of duct bank 2 over trench 1 and to lower the duct bank 2 onto supports 8 across the top of trench 1. This is possible because of the flexibility of the plastic material of the conduits and because of the specified distance between Equipment "A" 11 and Equipment "B" 12. This flexibility and specified distance allow duct bank 2 to bend when Equipment "A" 11 moves one end toward the top of the trench 1, while Equipment "B" 12, moves forward concurrently with equipment "B" 11, advancing only to a distance, e.g., by way of example, approximately one half the distance equipment "B" 11 did. The duct bank is bent laterally approximately seven (7) degrees onto the top of the trench, e.g., for a three (3) feet wide duct bank, or approximately fourteen (14) degrees for a six (6) feet wide duct bank.

After Equipment "A" 11 sets its end of duct bank 2 on supports 8 across the top of trench 1, Equipment "A" 11 moves back and goes around Equipment "B" 12 to a distance, e.g., of approximately thirty (30) feet beyond Equipment "B" 12.

Equipment "A" 11 then lifts duct bank 2 with its forks 14 to a position above supports 6 to approximately the same height Equipment "B" 12 is holding duct bank 2. Supports 6 are removed from under this new portion of duct bank 2 now lifted by Equipment "A" 11.

Now Equipment "B" 12 moves forward carrying its portion of duct bank 2 over trench 1 and lowers this portion of duct bank 2 onto supports 8 that rest across the top of trench 1, in the same manner as explained above. Equipment "B" 12 carries its portion of the duct bank over the trench while Equipment "B" 11 concurrently advances, but only to a position, e.g., by way of example, approximately one half the distance Equipment "B" 12 did. Duct bank 2 now is bent at approximately the same number of degrees as detailed above.

After Equipment "B" 12 sets its portion of the duct bank on supports 8, Equipment "B" 12 moves back and goes around Equipment "A" 11 to a distance, e.g., approximately thirty (30) feet beyond Equipment "A" 11 and proceeds to lift duct bank 2 with its forks 14, above supports 6, to approximately the same height Equipment "A" 11 is holding duct bank 2, and supports 6 are removed.

Figure 9:
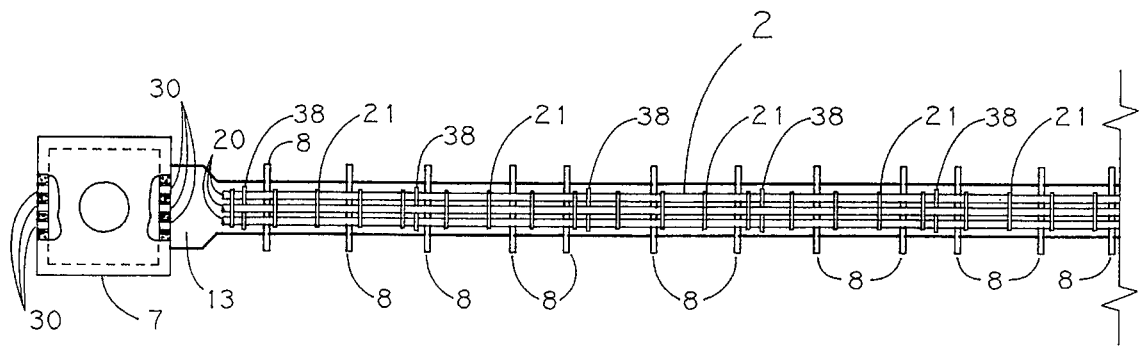
FIG. 9 provides a plan view of the duct bank already completely set, on supports, over the trench in accordance with the present invention.
Figure 10:
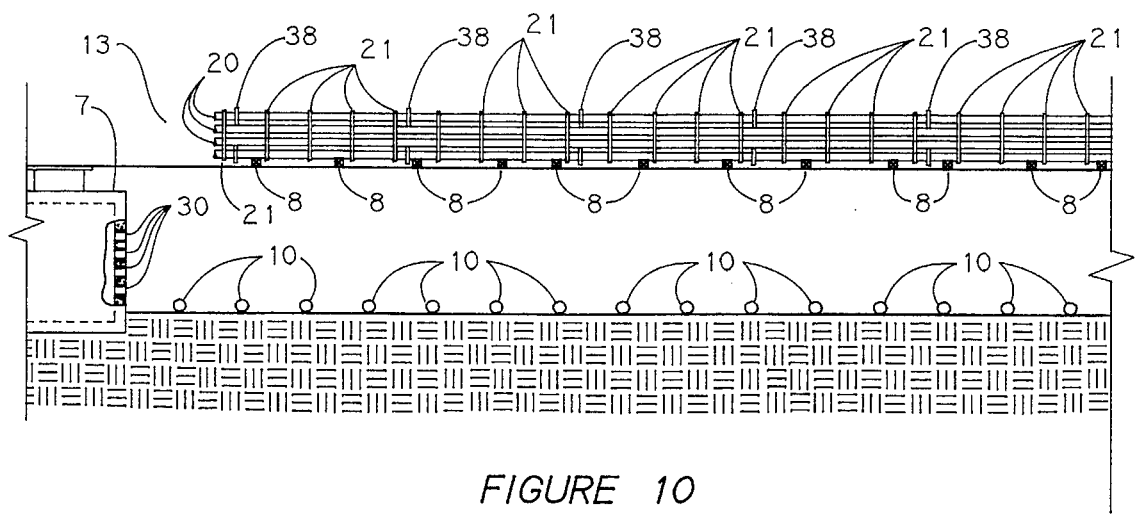
FIG. 10 shows an elevation view, partially in section, including supports on the bottom of the trench.

This sequence is repeated over and over again until the entire length of duct bank 2 is resting upon supports 8 (FIGS. 9 and 10) transversely positioned over the top of the trench.

Figure 11:
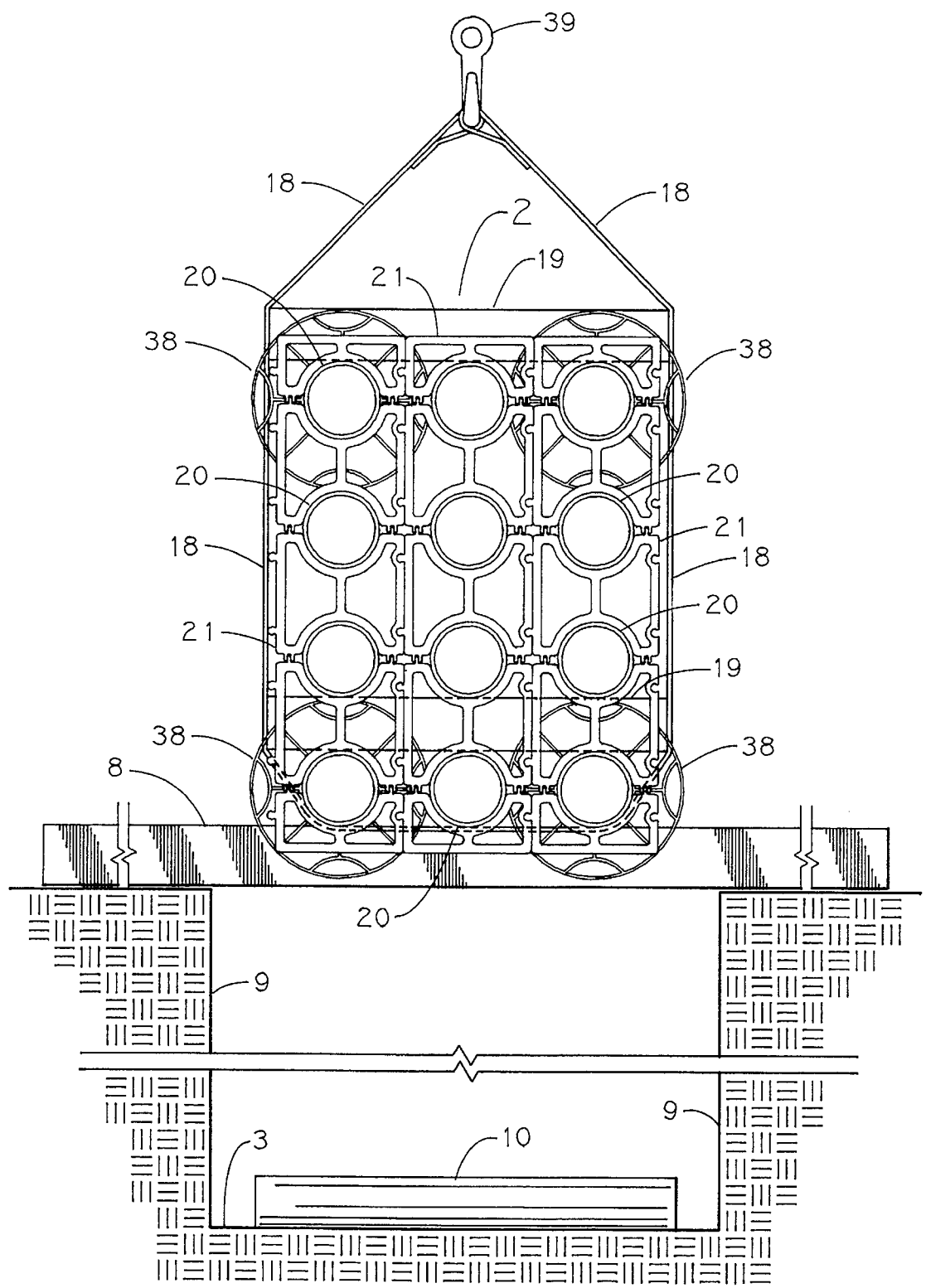
FIG. 11 provides a sectional view of the duct bank on supports across the top of the trench and shows the conduits, the spacers holding the conduits in place, the lifting sling, two supports across the duct bank, where the slings take hold, and round spacers on the corner conduits.
Figure 12:
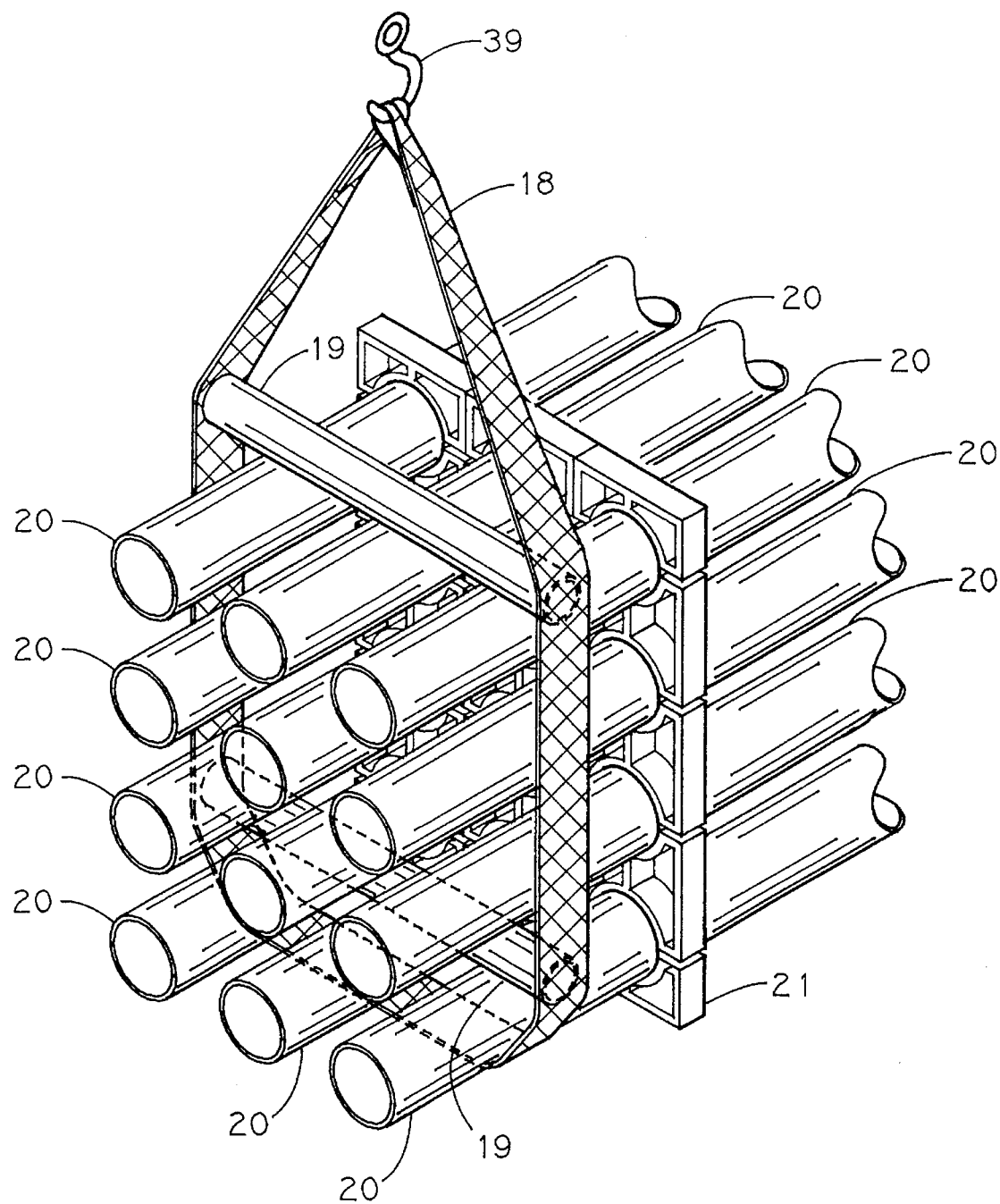
FIG. 12 provides a perspective view of a portion of the lifted duct bank and plastic spacers holding the conduits and cross-sectional supports at the sling.

Prior to lifting the duct bank, two supports 19 (FIGS. 11 and 12) are placed across the width of duct bank 2 at the points where slings 18 from Equipment "A" 15, "B" 16, and "C" 17 (FIG. 13) will engage duct bank 2 for lifting purposes.

Supports 19 (FIG. 12) are, preferably, pieces of two and one half inches nominal size conduit, having a three inches outside diameter. Supports 19 also can be pieces of steel pipe, pieces of lumber, and other similar structural materials.

One support 19 is placed on the top layer of conduit 20, and another support 19 is placed between the two bottom layers of conduit 20. These supports 19 are installed for lifting and stability purposes and to prevent duct bank 2 from smashing and crushing during lifting.

After supports 19 are installed at each equipment location, slings 18 are placed under the bottom ducts 20 by using a length of rod or rebar with a hook at one end. Slings 18 are hooked and pulled across the trench and around duct bank 20 and are placed in line with supports 19. Slings 18 then are attached to lifting hooks 39.

Figure 15:
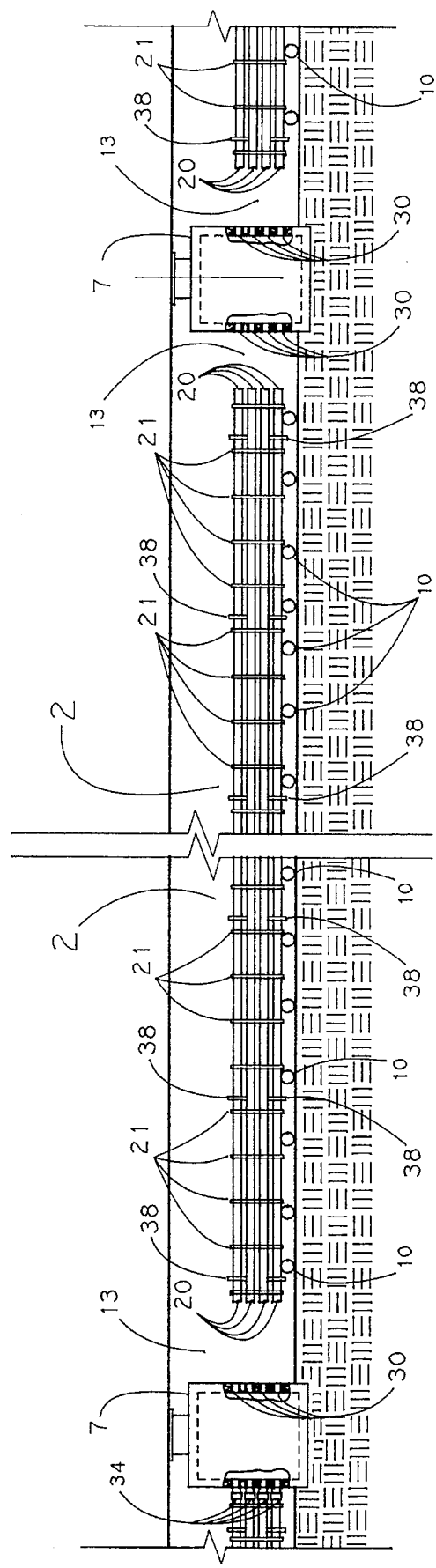
FIG. 15 provides an elevation view, partially in section, of two manholes and the duct bank resting on supports on the bottom of the trench.

The second step (FIG. 13) is to lower the duct bank into trench 1, until the entire length is set on supports 10 at the bottom of the trench (FIG. 15).

Figure 13:
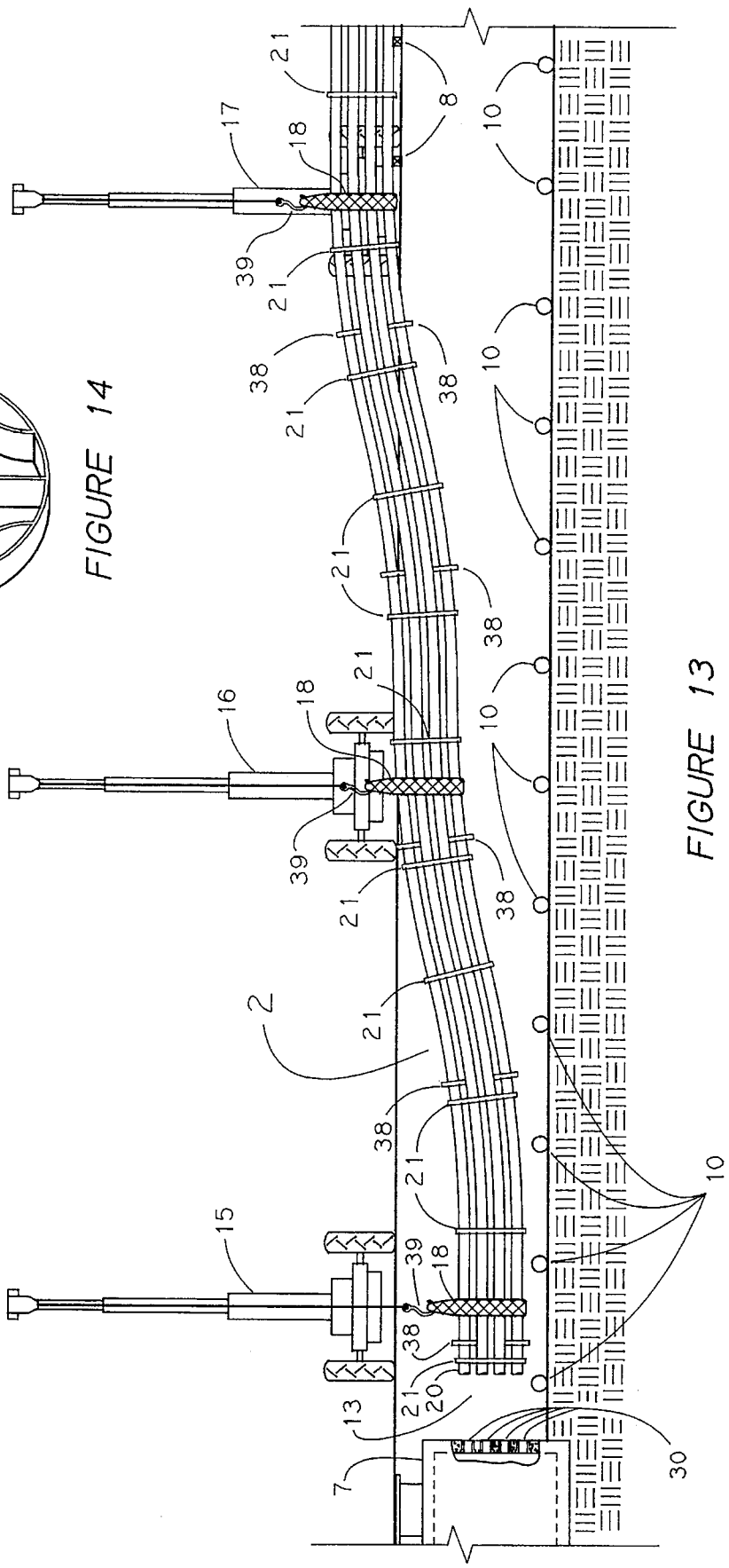
FIG. 13 provides an elevation view, partially in section, of the duct bank being lowered into the trench by three pieces of equipment.

FIG. 13 provides a schematic which demonstrates the second step of setting duct bank 2 inside the trench. By the method and means of the present invention, at least two, and in some cases preferably three or more, pieces of equipment are utilized, herein called Equipment "A" 15, "B" 16, and "C" 17. Preferably, the number of pieces of equipment is higher depending on more conduits in the cross section of the duct bank, larger diameters of conduits, and deeper sections of the trench. These pieces of equipment could be hydraulic lifts, truck-mounted cranes, bucket trucks (with the right capacity), or similar lifting equipment.

The lifting equipment units or pieces of equipment are set apart at a distance, e.g., of approximately 30 feet from each other. Equipment "A" 15 is set, by way of example, at approximately 10 feet from the end of duct bank 2, i.e., from where the lifting operation starts. These distances, as above explained, depend on the size and weight of the duct bank.

All three pieces of equipment use their lifting devices 39 and four-inch wide nylon slings 18, or slings of similar materials, to lift duct bank 2 from supports 8 that rest across the top of trench 1.

Equipment "A" 15, "B" 16, and "C" 17 lift a portion of duct bank 2 above supports 8, while the remainder of the bank is still resting on supports 8 over the trench, beyond Equipment "C" 17. Supports 8 now are removed from under the lifted portion of duct bank 2.

Equipment "A" 15 lowers its end of duct bank 2 into trench 1 until it partially rests upon the pieces of conduit 10 previously laid on bottom 3 of the trench. Equipment "B" 16 concurrently with Equipment "A" 15 also lowers its portion of duct bank 2, but only to approximately half the distance between the top and the bottom of the trench and stops there. At this point, the duct bank is bent approximately seven and one half degrees from the horizontal position above the trench and the bottom of the trench (for an 8-foot deep trench) or approximately fifteen degrees (for a sixteen-feet deep trench). Also at this point, Equipment "B" 16 and "C" 17 are holding the weight of the portion of duct bank which is bent down, thereby to avoid placing that weight upon the first of the remaining supports 8 above the trench.

Round, plastic spacers 38 (FIG. 13 and FIG. 14) are utilized to prevent spacers 21 from snagging against the trench walls. Spacers 38 are free to rotate, and they provide a smooth, flat surface 40 which is beyond the maximum width of spacers 21. Any sideways movements of duct bank 2 as it is being lowered into the trench would make spacers 38 rotate and slide against the trench walls instead of snagging spacers 21 against the trench walls.

Sling 18 from Equipment "A" 15 is unhooked and removed. Equipment "A" 15 then moves back and goes around equipment "B" 16 and "C" 17 to a distance, e.g., approximately 30 feet from Equipment "C" 17 (or whatever distance it might be required, as previously explained). New supports 19 are placed across the width of the duct bank, in the same fashion as explained above, at the new location of Equipment "A" 15. Sling 18 from Equipment "A" 15 is placed under the bottom ducts 20 by using a length of rod or rebar as explained before. Sling 18 is placed around duct bank 2 where supports 19 are located and is attached to hook 39. Then Equipment "A" 15 proceeds to lift duct bank 2 high enough to remove supports 8. Supports 8 are removed from under the new portion of duct bank 2 now lifted by Equipment "A" 15.

Equipment "B" 16 proceeds to complete lowering its end of duct bank 2 into trench 1 until duct bank 2 partially rests upon the pieces of conduit 10 previously laid on bottom 3 of the trench 1. Equipment "B" 16 had already lowered its portion of duct bank 2 to approximately half way into the trench concurrently with Equipment "A" 15, which had lowered its portion of duct bank 2 all the way to the bottom of the trench.

Equipment "C" 17 concurrently with Equipment "B" 16 also lowers its portion of the duct bank, but only to a position, by way of example, approximately half the distance between the top and the bottom of the trench and stops there. At this position, the duct bank is bent approximately seven and one half degrees from the horizontal position above the trench and the bottom of the trench for an 8-foot deep trench or approximately fifteen degrees for a 16-foot deep trench. Also at this position, Equipment "C" 17 and Equipment "A" 15 are holding the weight of the portion of duct bank which is bent down, avoiding placing that weight upon the first of the remaining supports 8 above the trench.

Next, sling 18 from Equipment "B" 16 is unhooked and removed. Equipment "B" 16 then moves back and goes around Equipment "C" 17 and "A" 15 to a distance, e.g., approximately 30 feet from Equipment "A" 15. New supports 19 are placed across the width of the duct bank at the new location of Equipment "B" 16. Sling 18 from Equipment "B" 16 is placed under the bottom ducts 20 using a length of rod or rebar. Sling 18 is placed around duct bank 2, where supports 19 are located, and is attached to hook 39. Equipment "B" 16 then proceeds to lift duct bank 2 high enough to remove supports 8.

Supports 8 are removed from under the new portion of duct bank 2 now lifted by Equipment "B" 16.

Equipment "C" 17 proceeds to complete lowering its end of duct bank 2 into trench 1 until duct bank 2 partially rests upon the pieces of conduit 10 previously laid on bottom 3 of the trench. Equipment "C" 17 had already lowered its portion of duck bank 2 to approximately halfway into the trench concurrently with Equipment "B" 16, which had lowered its portion of duct bank 2 all the way to the bottom of the trench.

Equipment "A" 15 concurrently with Equipment "C" 17 also lowers its portion of the duct bank, but only to approximately half the distance between the top and the bottom of the trench and stops there. At this point, the duct bank is bent approximately seven and one half degrees from the horizontal position above the trench and the bottom of the trench (for an 8-foot deep trench) or approximately fifteen degrees (for a 16-foot trench). Also at this point, Equipment "A" 15 and Equipment "B" 16 are holding the weight of the portion of duct bank which is bent down, avoiding placing that weight upon the first of the supports 8 above the trench.

Then sling 18 from Equipment "C" 17 is unhooked and removed. Equipment "C" 17 now moves back and goes around Equipment "A" 15 and "B" 16 to a distance approximately 30 feet from the Equipment "B" 16. New supports 19 are placed across the width of the duct bank at the new location of Equipment "C" 17. Sling 18 from Equipment "C" 17 is placed under the bottom duct 20, by using a length of rod or rebar. Sling 18 is placed around duct bank 2, where supports 19 are located and then is attached to hook 39. Equipment "C" 17 proceeds to lift duct bank 2 high enough to remove supports 8. Supports 8 are removed from under the new portion of duct bank 2 now lifted by Equipment "C" 17.

Equipment "A" 15 lowers its end of duct bank 2 into trench 1, and the sequence is repeated over and over again, until the entire length of duct bank 2 is positioned and laying on the bottom of the trench (FIG. 15) on top of pieces of conduit 10.

After duct bank 2 is in the trench, two operations start approximately at the same time. One is pouring concrete to encase the duct bank in a concrete envelope. Because the present invention utilizes a trench with straight walls, there is no need to install forms for pouring the concrete. The width of the trench is calculated to provide the required three inches of concrete beyond the duct bank width. The pouring starts from approximately the center of the length of duct bank, and pouring proceeds toward each end 13.

Figures 16, 17:
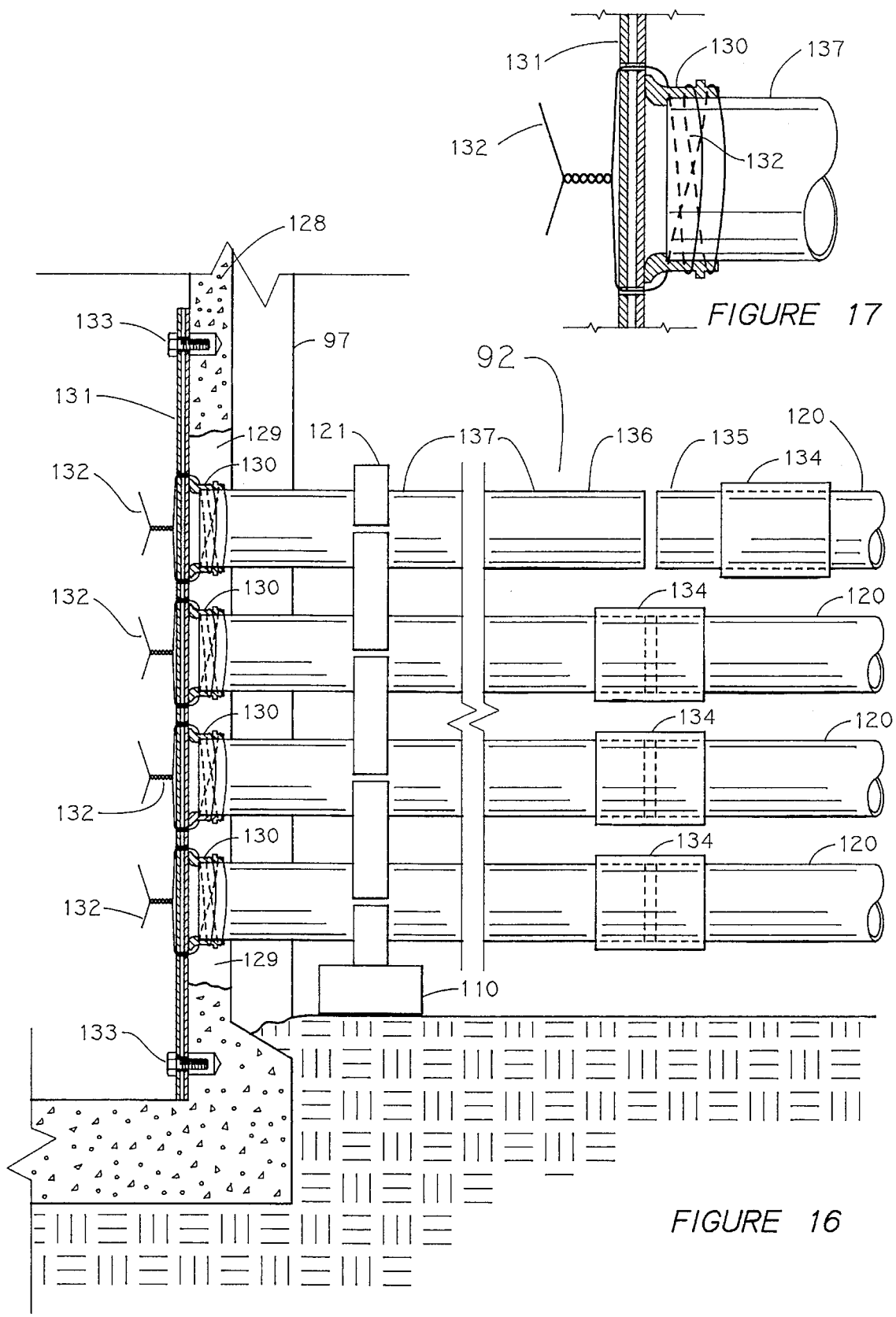
FIG. 16 provides an elevation view, partially in section, of the tie-ins by the conventional method, including a hole through the manhole wall, a plywood board on one side of the wall, bell-ends tied-down to the plywood board on the other side, and conduits inserted into the bell-ends.
FIG. 17 provides a sectional detail view of a conduit inserted into a bell-end and the bell-end tied down with wires against the plywood board by the conventional method.
Figure 19:
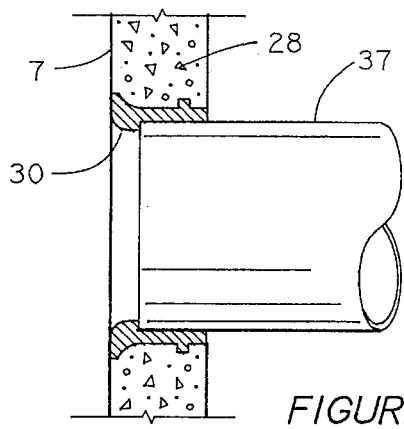
FIG. 19 provides a sectional detail view of the conduit inserted into the bell-end and the bell-end precast in the manhole wall in accordance with the present invention.

By the conventional method, referring to FIGS. 16 and 17 which represent the prior art, the manhole walls 128 were broken by sledge-hammering, which produced a large, very irregular opening 129 on manhole wall 128. A piece of plywood board 131 was temporarily fixed against the inside of wall 128 of precast manhole 97 to cover the opening created by sledge-hammering. This plywood board was temporarily attached to the manhole inside wall by utilizing lead anchors 133 on two-foot centers. Next one standard bell-end 130 for each conduit 120 on the duct bank was attached to plywood board 131 to coincide with the elevation and position of the conduit 120 for each standard bell-end 130 to be tied into. Each bell-end 130 was tied-down against board 131 by means of tie-wires 132, through holes drilled through plywood board 131, in order to prevent the bell-ends from moving too much when concrete was poured to encase the entire duct bank.

Straight conduit couplings 134, without a dividing rib on the inside, were inserted over ends 135 of each conduit 120 from the duct bank. Couplings 134 were inserted over ends 135 leaving a few inches exposed, in order to apply an special adhesive later.

Then one end of each standard length of conduits 137 was coated with a special adhesive and inserted into the bell-ends 130 starting from the bottom layer of bell-ends 130. This operation was performed from inside of the trench. The special adhesive set in a matter of seconds. After each individual standard length of conduit 137 was firmly glued to its bell-end, conduit 137 was saw-cut, so as to have its end 136 approximately abutting to end 135 from the corresponding conduit 120 from the duct bank.

Now end 135 from the corresponding conduit 120 from the duct bank and end 136 from conduit 137 were coated with the special adhesive, and coupling 134 then was tapped on one end, to easily and quickly slide it over both ends 135 and 136. This completed the tie-in to the manhole for that one conduit 120 from the duct bank. The operation was repeated for each conduit 120 from the duct bank until all conduits were tied-in to the manhole.

After the above-described tie-ins were made, concrete was poured to encase the duct bank and to fill openings 129 created by jackhammering manhole walls 128. The pouring started from the center of the duct bank length and pouring proceeded toward each manhole. After the concrete set, plywood boards 131 were removed. Many irregularities remained on the surface of inside wall 128 of the manholes which must be patched.

Figure 18:
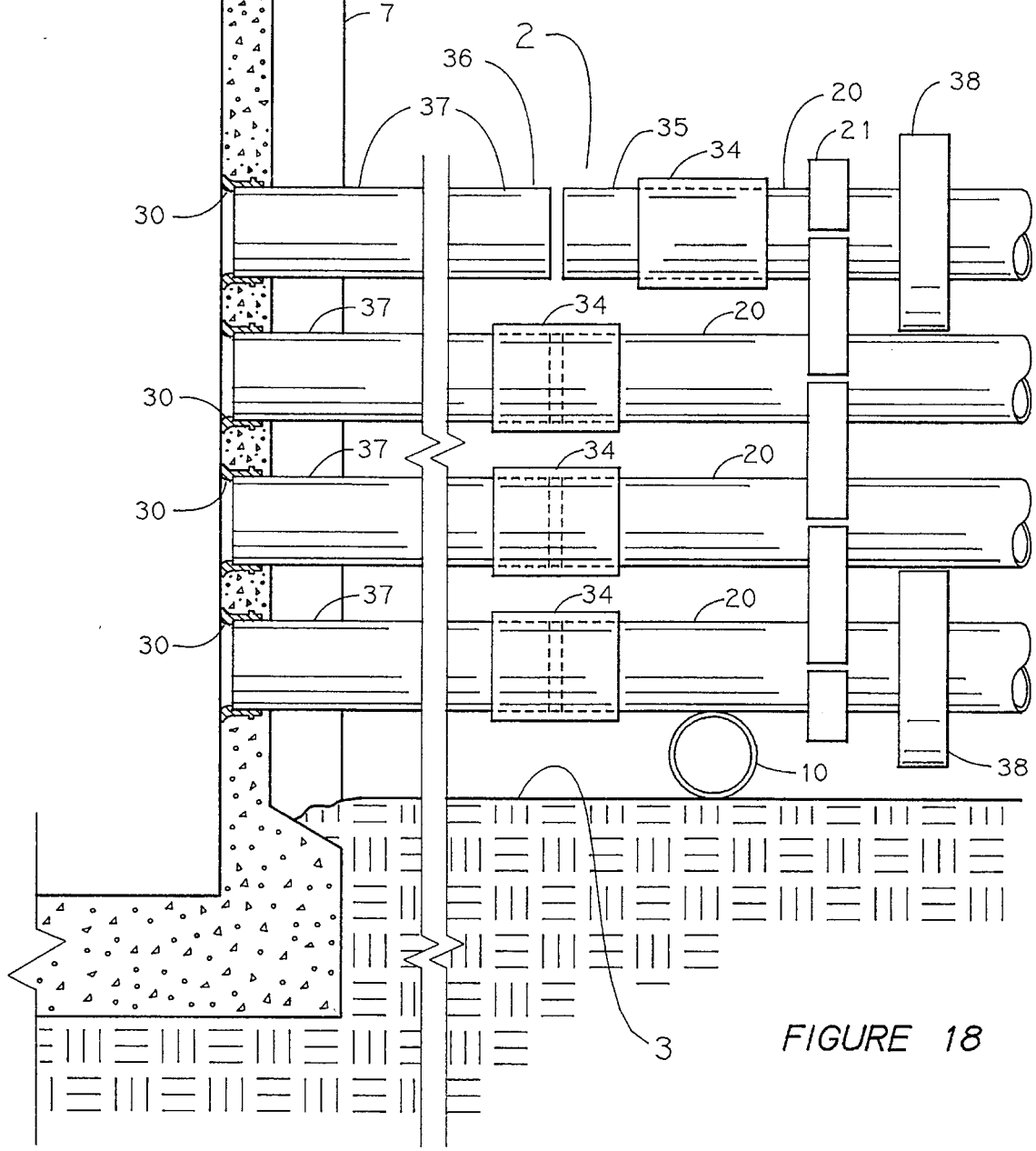
FIG. 18 provides an elevation view, partially in section, of the tie-ins in accordance with the present invention and novel bell-ends precast in the manhole wall with conduits inserted into the bell-ends.

Referring now to FIG. 18, the second operation of the present invention includes completing the tie-ins from each conduit 20 from each of the two ends 13 of duct bank 2 into bell-ends 30. By the present invention, bell-ends 30 are cast into precast concrete manhole wall 28 at the time the manhole is built. Standard, plastic bell-ends can be used when the precast concrete manholes are ordered, purchased, and installed in the ground by the same contractor who installs the duct banks and who also does the cable pulling and splacing from the manholes.

Precast concrete manholes 7, depending on the application and more so depending on their location, can have walls 28 as thick as ten inches or more. For those manholes, a standard bell-end 30 cannot be cast in wall 28 at the time the manhole is cast.

The method and means of the present invention provide novel bell-ends, adjustable in length. The novel bell-end of the present invention provides an outer surface threaded (not shown) to receive an adapter (not shown) having female threads on one end while at its other end providing an opening to receive conduit 37 and to be glued to conduit 37. The novel adjustable bell-end makes it possible to cast it in manhole walls of any thickness.

The tie-in operation then proceeds in accordance with the present invention, and after the tie-in operation to the bell-ends is complete, concrete is poured so as to encase the entire duct bank in a solid concrete block, called concrete envelope, which is 3 inches larger on each side (top, bottom and two sides) than the duct bank itself. Then, the trench is backfilled with excavated soils. The backfilling can be done either the same day, if "High Early Concrete" is poured or the next day if "Regular Curing Concrete" is poured instead. Thus it can be seen that the invention accomplishes all of its objectives.

The apparatus and process of the present invention are not limited to the descriptions of specific embodiments presented hereinabove, but rather the apparatus and process of the present invention should be viewed in terms of the claims that follow and equivalents thereof. Further, while the invention has been described in conjunction with several such specific embodiments, it is to be understood that many alternatives, modifications, and variations will be apparent to those skilled in the art in light of the foregoing detailed descriptions. Accordingly, this invention is intended to embrace all such alternatives, modifications, and variations which fall within the spirit and scope of the appended claims.

What is claimed is:

1. A method of installing an underground duct bank, comprising:

(a.) providing a plurality of flexible, substantially hollow, elongated ducts or conduits;

(b.) assembling said ducts or conduits into a preassembled duct bank having a substantially continuous length of 500 feet or more above ground;

(c.) excavating an underground trench with substantially straight sidewalls of sufficient dimension to hold said above-ground-preassembled duct bank;

(d.) placing said above-ground-preassembled duct bank into said underground trench to provide an underground duct bank using at least three pieces of lifting and lowering equipment by:

(i) sequentially moving said above-ground-preassembled duct bank having a substantially continuous length of 500 feet or more above ground to a position supported by transverse support members spanning said trench to position said above-ground-preassembled duct bank above ground directly over said trench;

(ii) placing said above-ground-preassembled duct bank into said underground trench by sequentially lifting said above-ground-preassembled duct bank;

(iii) removing said transverse support members spanning said trench;

(iv) sequentially lowering said above-ground-preassembled duct bank into said trench onto transverse support members positioned in the bottom of said trench to provide said underground duct bank; and (v) providing for an angle of displacement less than about twenty degrees from the horizontal for the above-ground-preassembled duct bank, while lowering said above-ground-preassembled duct bank into the bottom of said trench, and onto said transverse support members positioned in the bottom of said trench;

(e.) installing precast concrete manholes at 500 feet or more distances apart in the ground; and (f.) tieing said preassembled underground duct bank into said precast concrete manholes.

2. A method of installing an underground duct bank as set forth in claim 1, wherein said excavating said underground trench comprises placing excavated soil from excavating said trench on the above-ground side of said trench away from said above-ground preassembled duct bank.

3. A method of installing an underground duct bank as set forth in claim 1, wherein said assembling said ducts or conduits into a preassembled duct bank above ground comprises assembling said ducts or conduits in an array of layers held by a plastic grid of transverse spacers.

4. A method of installing an underground duct bank as set forth in claim 3, wherein said assembling said ducts or conduits into a preassembled duct bank above ground held in an array of layers by a plastic grid of transverse spacers further comprises positioning round, free-to-rotate plastic spacers in groups of four positioned one on the conduit on each corner of the cross section of said preassembled duct bank above ground to facilitate lowering said preassembled duct bank into said trench.

5. A method of installing an underground duct bank as set forth in claim 1, wherein said assembling said ducts or conduits into a preassembled duct bank above ground comprises assembling said ducts or conduits in an array of layers to form a preassembled duct bank supported above ground on transverse support members.

6. A method of installing an underground duct bank as set forth in claim 5, wherein said placing said preassembled duct bank into said underground trench to provide an underground duct bank comprises supporting said duct bank as it is being preassembled above ground on transverse support members and sequentially moving said preassembled duct bank supported above ground on transverse support members to a position supported by transverse support members spanning said trench to position said preassembled duct bank above ground directly over said trench.

7. A method of installing an underground duct bank as set forth in claim 6, wherein said placing said preassembled duct bank into said underground trench to provide an underground duct bank further comprises sequentially lifting said preassembled duct bank, removing said transverse support members spanning said trench, and lowering said preassembled duct bank into said trench using two or more pieces of lifting and lowering equipment to provide for said angle of displacement for the preassembled duct bank, from the horizontal, while lowering said preassembled duct bank into the bottom of said trench.

8. A method of installing an underground duct bank as set forth in claim 6, wherein said angle of displacement for the preassembled duct bank comprises less than about fifteen degrees from the horizontal.

9. A method of installing an underground duct bank, comprising:

(a.) providing a plurality of flexible plastic, substantially hollow, elongated ducts or conduits;

(b.) assembling said ducts or conduits in an array of layers held by a plastic grid of duct bank transverse spacers into an above-ground-assembled duct bank having a substantially continuous length of 500 feet or more above ground supported above ground on transverse support members;

(c.) excavating an underground trench having substantially straight sidewalls and sufficient dimension to contain said assembled duct bank, while placing excavated soil from excavating said trench on the above-ground side of said trench away from said assembled duct bank;

(d.) moving said assembled duct bank supported above ground on said duct bank transverse support members to a position supported by trench top transverse support members spanning said trench to position said assembled duct bank above ground directly over said trench, and placing said assembled duct bank into said underground trench by sequentially lifting said assembled duct bank, removing said trench top transverse support members spanning said trench, and lowering said assembled duct bank into said trench using at least three pieces of lifting and lowering equipment to provide for an angle of displacement less than about twenty degrees from the horizontal for the assembled duct bank, while lowering said assembled duct bank into the bottom of said trench, and onto trench bottom transverse support members positioned in the bottom of said trench, to provide an underground duct bank;

(e.) installing precast concrete manholes at specified distances apart in the ground prior to excavating said underground trench;

(f.) tieing said assembled underground duct bank into said precast concrete manholes at specified distances apart in the ground;

(g.) positioning round, freely rotatable plastic spacers in groups of four positioned to facilitate lowering said assembled duct bank into said trench;

(h.) receiving said ducts or conduits into at least one said precast concrete manhole; and (i.) connecting said ducts or conduits to said concrete manhole at a sidewall through a bell-end, adjustable in length, having threads in the outer surface of the bell-end for receiving an adapter threaded on one end and adapted to receive said duct or conduit into said adapter's other end.

* * * * *